United States Patent [19]

Beck et al.

[11] Patent Number: 4,521,217
[45] Date of Patent: Jun. 4, 1985

[54] PHTHALOCYANINE AND AZO DYESTUFF MIXTURES AND THEIR USE FOR DYEING PAPER

[75] Inventors: Ulrich Beck, Bornheim; Frank-Michael Stöhr, Burscheid; Horst Nickel, Leverkusen, all of Fed. Rep. of Germany

[73] Assignee: Bayer Aktiengesellschaft, Leverkusen, Fed. Rep. of Germany

[21] Appl. No.: 568,854

[22] Filed: Jan. 6, 1984

[30] Foreign Application Priority Data

Jan. 13, 1983 [DE] Fed. Rep. of Germany ....... 3300896

[51] Int. Cl.³ .................... C09B 47/04; C09B 67/22; D21H 1/46
[52] U.S. Cl. .......................................... 8/639; 8/641; 8/644; 8/654; 8/657; 8/661; 8/682; 8/919
[58] Field of Search .................... 8/639, 644, 661, 682, 8/641

[56] References Cited

U.S. PATENT DOCUMENTS 2,956,853 10/1960 Dach et al. .............................. 8/566
4,198,203 4/1980 Groll et al. .............................. 8/527
4,198,268 4/1980 Frei et al. ................................ 8/524

FOREIGN PATENT DOCUMENTS 3224786 1/1984 Fed. Rep. of Germany .

*Primary Examiner*—A. Lionel Clingman
*Attorney, Agent, or Firm*—Sprung, Horn, Kramer & Woods

[57] ABSTRACT

Mixtures of a phthalocyanine dyestuff and a substantive azo dyestuff which preferably has cationic or basic groups are suitable for dyeing paper.

6 Claims, No Drawings

PHTHALOCYANINE AND AZO DYESTUFF MIXTURES AND THEIR USE FOR DYEING PAPER

The invention relates to mixtures of A. a phthalocyanine dyestuff and B. a substantive azo dyestuff which preferably has cationic or basic groups and to their use for dyeing paper.

Suitable phthalocyanine dyestuffs can contain cationic, basic and optionally acid groups. Dyestuffs of this type are described, for example, in British Patent Specification Nos. 784,843 and 1,013,236, German Auslegeschrift Nos. 1,226,731 and 1,240,893, in U.S. Pat. No. 4,198,203 and Swiss Patent Specification No. 446,578. Preferred phthalocyanine dyestuffs are Cu-phthalocyanine dyestuffs which have cationic and/or basic groups and optionally contain sulphonic acid groups.

Of these dyestuffs, noteworthy dyestuffs have the formula

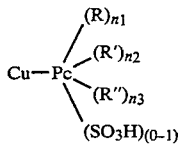
(I)

wherein
Cu—Pc denotes the radical of a Cu-phthalocyanine dyestuff with $n_i = 0-4$ ($i = 1-3$), $$\sum_{i=1}^{3} n_i = n$$

and $n = 1.5 - 4$,
R, R' and R", independently of one another, denote a radical of the formula

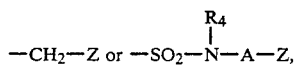

Z denotes a radical of the formula

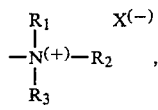
(Za)

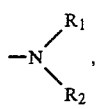
(Zb)

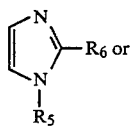
(Zc)

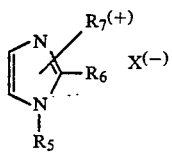
(Zd)

$R_1$, $R_2$ and $R_3$, independently of one another, denote hydrogen or optionally substituted alkyl, preferably methyl, ethyl, β-aminoethyl or β-hydroxyethyl, or $R_1$ and $R_2$ together with the nitrogen atom, form a ring which optionally contains a further hetero atom, preferably an optionally substituted morpholine, pyrrolidine, piperidine or piperazine ring, or $R_1$, $R_2$ and $R_3$, together with the nitrogen atom, form a pyridinium or picolinium ring, $R_4$ denotes hydrogen or optionally substituted alkyl, preferably methyl, ethyl, hydroxymethyl or hydroxyethyl, or together with $R_1$, denotes ethylene, $R_7$ sits on a nitrogen atom, $R_5$, $R_6$ and $R_7$, independently of one another, denote hydrogen or optionally substituted alkyl, preferably methyl, ethyl or hydroxyethyl, $R_5$ additionally denotes a radical of the formula

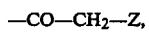

$X^{(-)}$ denotes an anion, preferably chloride, bromide, iodide, sulphate, methosulphate, phenylsulphonate, toluoylsulphonate, methanesulphonate, formate, acetate, propionate, citrate or lactate, A denotes a bridge member, preferably an alkylene radical of the formula

and
m denotes 1, 2, 3 or 4, preferably 3.

Suitable basic or cationic azo dyestuffs are described in German Patent Application P 32 24 786 and have the formula

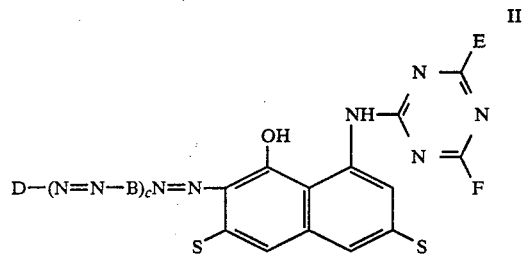
II wherein
S denotes a sulphonic acid group or an optionally inner salt of this sulphonic acid group, E denotes halogen, hydroxyl, alkoxy, alkyl, aryl or an optionally monosubstituted or disubstituted amino group, F denotes a radical of the formula —N⟨  ⟩N—R₈ or —N⟨  ⟩N⁽⁺⁾⟨R₈/R₉⟩ X⁽⁻⁾, $R_8$ and $R_9$ independently of each other, denote hydrogen, alkyl, alkenyl or aralkyl, D denotes the radical of a diazo component of the benzene, naphthalene or heterocyclic series, B denotes the radical of a coupling component of the benzene naphthalene series, c denotes 0 or 1 and $X^{(-)}$ denotes an anion, and wherein the cyclic and acyclic radicals can carry further substituents and wherein in the dyestuff molecule the total number of basic and/or cationic groups is greater than 2.

Of the dyestuffs of the formula (II), noteworthy dyestuffs have the formula

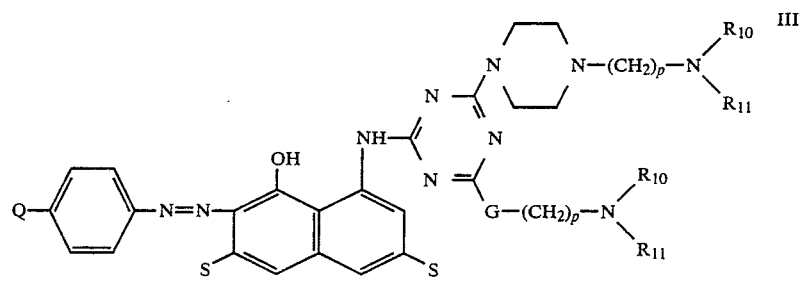

wherein
Q denotes a radical of the formula

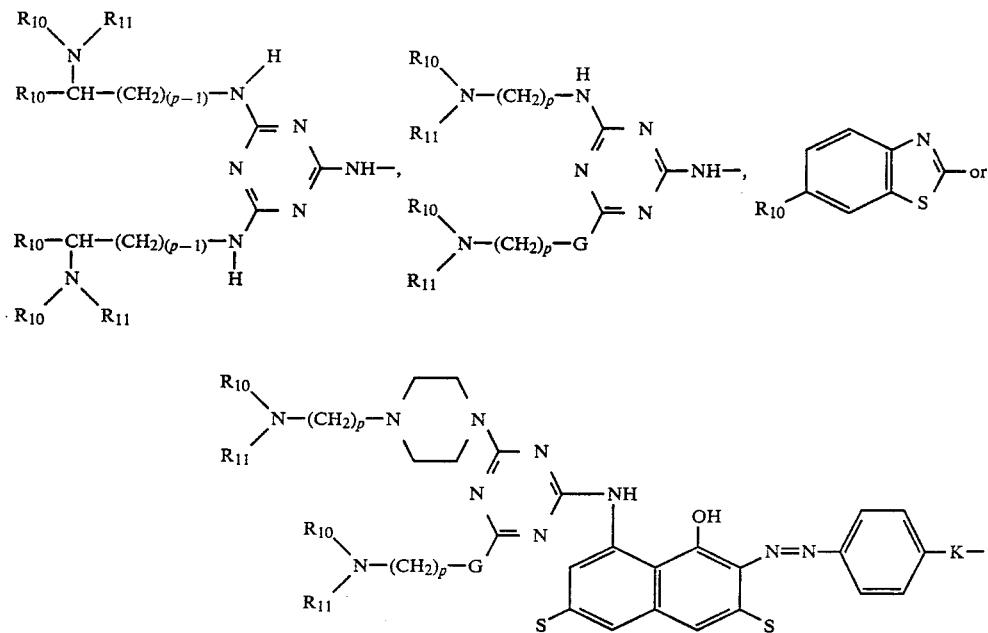

$R_{10}$ and $R_{11}$ denote hydrogen, methyl or ethyl,
P denotes 2 or 3,
G denotes NH or and
K denotes a direct bond, —NH—CO—, —NH—CONH—, —NHCO—$(CH_2)_p$CONH—, —$(CH_2)_p$—, —O—$(CH_2)_p$—O—, or —CONH—$(CH_2)_p$NHCO— and
S has the meaning given in formula (II).

Particularly preferred dyestuff mixtures according to the invention consist of components of the formulae

IV

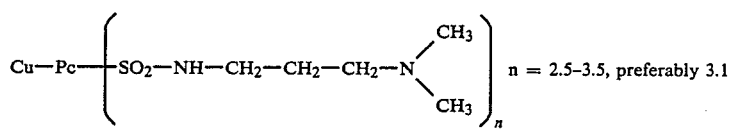

$n = 2.5\text{--}3.5$, preferably 3.1 and

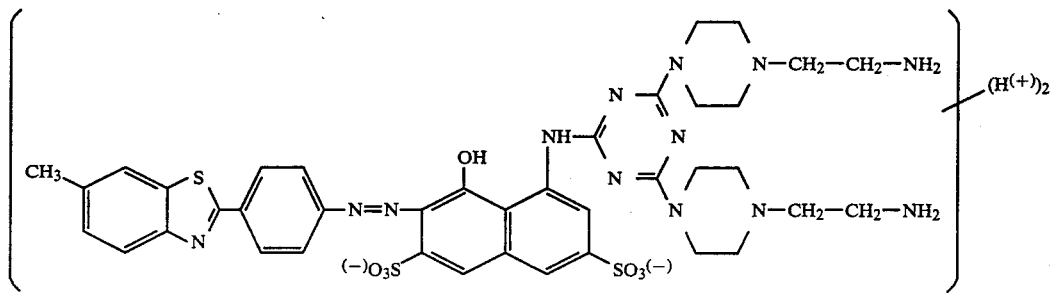

or of the acid additions of these dyestuffs, preferably of formic acid, acetic acid or methanesulphonic acid.

Components A and B are present in the mixture according to the invention in, for example, a molar ratio of 8:1 to 1:2, preferably 5:1 to 1:1.

Particularly suitable as component A are turquoise blue dyestuffs whose spectra in aqueous solution have a high transmission (low extinction) within the wavelength region from 350 to 560 nm. The transmission maxima are preferably within the region from 450 to 490 nm, while the transmission minima are within the region, say, from 580 to 640 nm.

Particularly suitable as component B are violet dyestuffs whose spectra in an aqueous solution have a high transmission within the wavelength region below 480 nm and above 640 nm. The transmission minima appear in the region between 520 and 570 nm.

The dyestuff mixtures according to the invention are in the form of a granulate, a powder or solutions. Preferred commercial forms are solutions which contain, for example, about 10% by weight of dyestuff.

It has now been found, surprisingly, that paper or cellulose can be dyed with the dyestuff mixtures according to the invention in clear, neutral blue hues of high brilliance. At the same time, the bath exhaustion is high and the wet fastness properties are good—even without addition of auxiliaries, such as alum or fixing agents.

The spectrum of the dyed paper has a transmission minimum within the region from 580 to 860 nm and a transmission maximum within the wavelength region below 480 nm.

The brilliance of a dyeing can be measured by the method described in DIN 6,174. This spectrophotometric analysis is also referred to in, for example, the journal "defazet", Volume 31, No. 8, 1977, pages 318–324.

The high brilliance obtained for the blue paper dyeings could not, in general, be inferred from the spectrum and any brilliance of the aqueous solution of the mixture. Dyestuffs which appear as brilliant in an aqueous solution can produce relatively dull hues in the dyeing of paper if the exhaustion behaviour is different or if there are special interactions between the cellulose fibre and the dyestuff.

In particular, the dyestuff mixtures according to the invention are used for dyeing cellulose fibres, preferably bleached fibres, in a weakly acid or weakly alkaline range, preferably at a cellulose suspension pH between 6.5 and 7.5.

It is known that bleached cellulose fibres are dyed with anionic substantive dyestuffs in the neutral range. In particular, tissue papers are also still largely dyed with anionic substantive dyestuffs. However, with rising ecological requirements—waste water pollution in respect of COD value and discolouration—and the rising bleeding-fastness demands on the dyed papers—for example in the case of serviettes or hygiene papers—anionic substantive dyestuffs prove inadequate in terms of these new requirements.

It is true that anionic dyestuffs can in principle produce clear blue shades. If, however, anionic substantive dyestuffs are to be used to dye tissue grades at about pH 7 to produce not only a clear hue but also high bath exhaustion and a good fastness to bleeding in water, alcohol, soap and milk, namely a fastness value of at least 4, alum and a fixing auxiliary, for example a dicyandiamideformaldehyde condensation product, have to be added. As a result, however, the dyeings are less clear, and they frequently even become dull.

High bath exhaustion and bleeding fastness combined with clear to brilliant blue shades are obtained with the mixtures according to the invention without the additional use of fixing agents or alum.

Dyestuff components A and B can be supplied to the substrate as finished mixtures or separately. In this case, the mixtures according to the invention are thus only prepared on the substrate or in the cellulose suspension.

Preferred solvents for the pure dyestuff are water, such alcohols such as methanol, ethanol, propanol, glycols and glycol ethers, preferably ethylene glycol, carboxamide preferably dimethylformamide, and such solubilisers as urea, dimethylurea, caprolactam or hydroxypropionitrile, and organic acids, such as formic acid, acetic acid and methanesulphonic acid.

They are used for dyeing paper in a conventional manner. The dyestuff mixtures are preferably used for pulp-dyeing, which involves adding the solutions of components A and B in the form of a mixture or separately to the low-density pulp or high-density pulp before the pulp reaches the wire. For example, about $3 \times 10^{-3}$ mol (relative to 10 g of fibres per liter of suspension) of component A and about $1 \times 10^{-3}$ mol of component B (relative to 10 g of fibres per liter of suspension) are added to a 1% strength suspension of bleached cellulose fibres.

Further methods of application are as follows:

Either a solution of the mixture is sprayed onto the paper, or the undyed paper, before it reaches the dry-end stage, passes through a size press in whose trough there is the solution of the mixture according to the invention. The paper dyed by spraying or dipping is then dried at the dry-end stage.

EXAMPLE A

A dry stuff consisting of 50% of bleached birch sulphate pulp and 50% of pine sulphate pulp is beaten with sufficient water in a hollander to a Schopper-Riegler freeness of 35° so that the solids content is slightly above 2.5%, and the slush pulp is then adjusted with water to a solids content of exactly 2.5%.

The suspension is brought to a pH 7. 10 parts by weight of a 0.5% strength aqueous solution of the formulations prepared in Examples 1–11 are added to 200 parts by weight of the slush pulp, and the mixture is stirred for 5 minutes. The resulting paper slurry is diluted with 500 parts of water and used in a conventional manner to prepare sheets of paper by sucking off over a sheet-former.

The parts in the following examples are parts by weight.

EXAMPLE 1a 1.9 parts of a dyestuff solution of 14 parts of the Cu—Pc dyestuff of the formula (IV) in which n=3.1 in glacial acetic acid, methanol and water are mixed with 1.0 part of a solution of 10 parts of the azo dyestuff (V) in formic acid, methanesulphonic acid and water.

This solution is used as described in Example A, this gives a sheet of paper dyed in a neutral brilliant blue which is very fast to bleeding (water: fastness level 5; alcohol: fastness level 5; soaps: fastness level 5; lactic acid: fastness level 5. The determination was in accordance with DIN 53,991). The dyestuff content in the waste waster is less than 4%.

The dyestuff content in the waste water was determined by photometry. The percentage figure in the examples relates to the residual amount of dyestuff in the waste water compared with the amount of dyestuff originally added.

EXAMPLE 1b

Brilliant blue dyeings which are very fast to bleeding are also obtained if dyestuff (V) is replaced by the following dyestuffs dissolved in formic acid, methane-sulphonic acid and water:

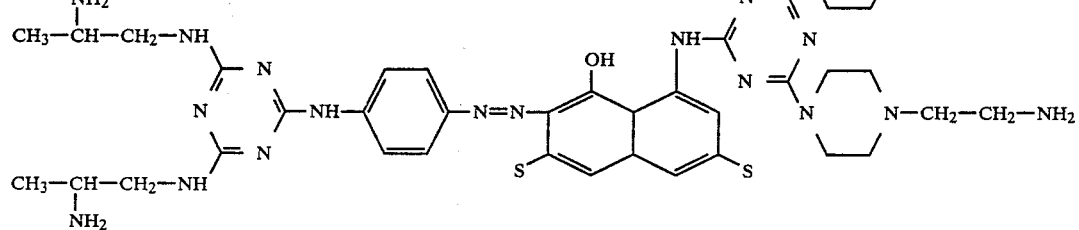

VI

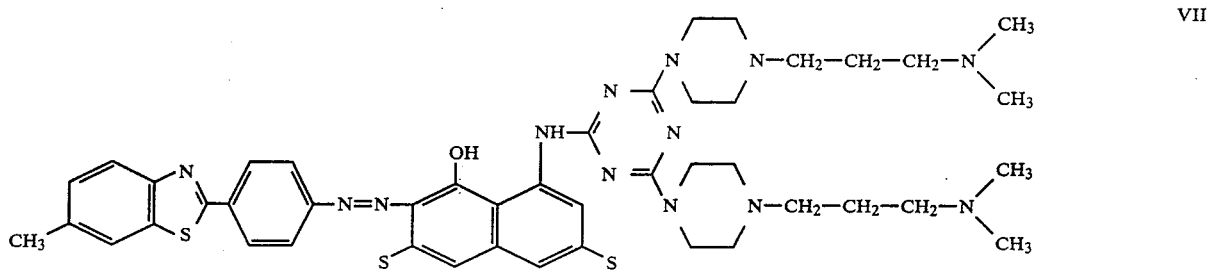

VII

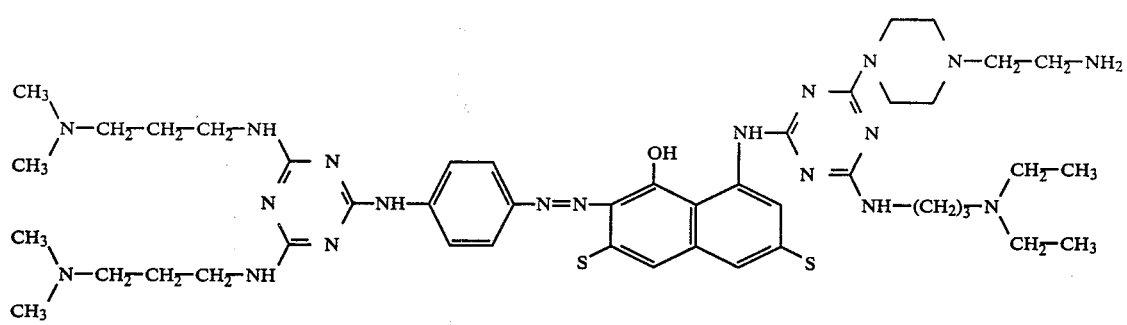

VIII

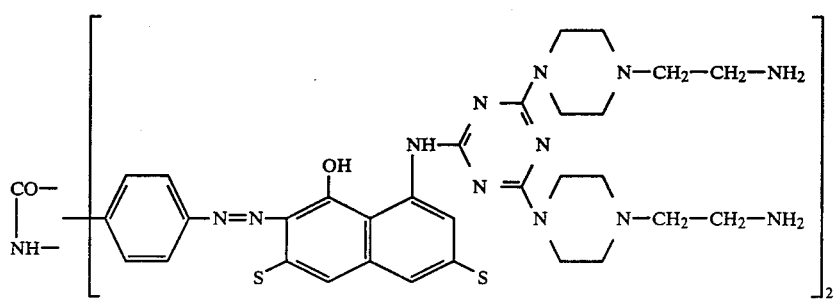

2 parts of a solution of 14 parts of the Cu—Pc dyestuff of the formula IV (n=3.1) in glacial acetic acid, methanol and water are mixed with 0.9 part of a solution of, alternatively, 10 parts of the azo dyestuff of the formula VI, VII, VIII or IX.

If these solutions are used as described in Example A, this gives a sheet of paper dyed in a neutral brilliant blue which is very fast to bleeding (water: fastness level 5; alcohol: fastness level 4–5; soaps: fastness level 4–5; lactic acid: fastnes level 5). The dyestuff content in the waste water is less than 5%.

EXAMPLE 2

3.3 parts of a solution of 19 parts of the dyestuff of the formula

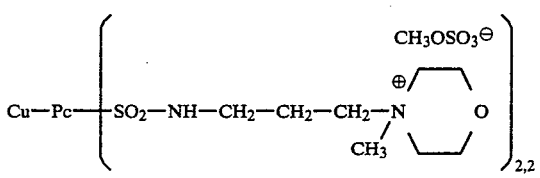

in formic acid and water are mixed with 1.0 part of a solution of 10 parts of the azo dyestuff IX in formic acid, methanesulphonic acid and water.

If this solution is used as described in Example A, this gives a sheet of paper dyed in a neutral brilliant blue which is very fast to bleeding (water: fastness level 5; alcohol: fastness level 5; soaps: fastness level 5; lactic acid: fastness level 4). The dyestuff content in the waste water is less than 4%.

EXAMPLE 3

3.4 parts of a solution of 15 parts of the formula

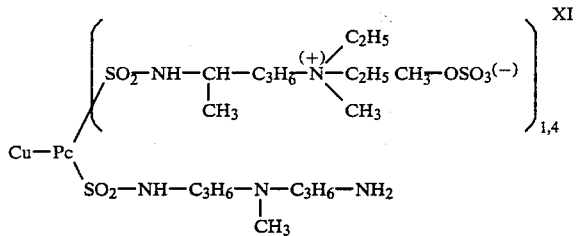

in glacial acetic acid and water are mixed with 1.2 parts of a solution of 12 parts of the azo dyestuff VII in formic acid, methanesulphonic acid and water.

If this solution is used as described in Example A, this gives a sheet of paper dyed in a slightly reddish brilliant blue which is very fast to bleeding (water: fastness level 5; alcohol: fastness level 4). The dyestuff content in the waste water is less than 5%.

EXAMPLE 4

3.5 parts of a solution of 15 parts of the dyestuff of the formula

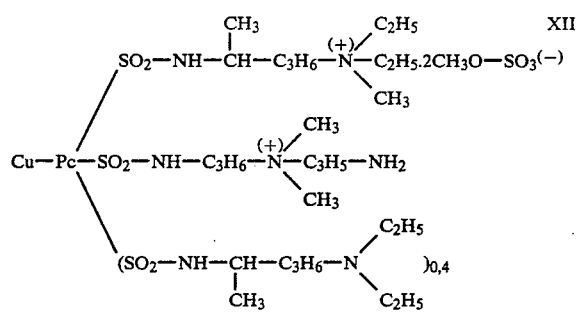

in glacial acetic acid and water are mixed with 1.5 parts of a solution of 10 parts of the azo dyestuff VIII in formic acid, methanesulphonic acid and water.

If this solution is used as described in Example A, this gives a sheet of paper dyed in a slightly reddish brilliant blue which is very fast to bleeding (water: fastness level 5; alcohol; fastness level 4–5; citric acid: fastness level 4). The dyestuff content in the waste water is below 4%.

EXAMPLE 5

2 parts of a solution of 14 parts of the dyestuff of the formula IV (n=3.1) in glacial acetic acid, methanol and water, are mixed with 0.8 part of a dyestuff of the formula

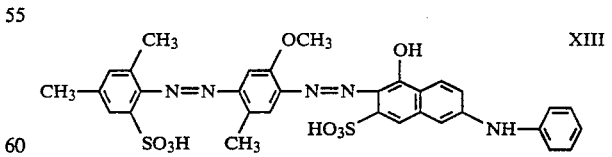

in diethylene glycol, diethanolamine and urea.

If this mixture is used as described in Example A, this gives a neutral brilliant blue shade which is very fast to bleeding (4–5 or 5) and hardly discolours the waste water.

Further blue mixtures are obtained if the following dyestuffs are mixed with one another:

| Example No. | Parts of turquoise blue of Example | Parts of violet solution of Example |
|---|---|---|
| 6 | 3.5 parts of Example 2 | 0.8 part of Example 1b, dyestuff of formula No. VI |
| 7 | 3.5 parts of Example 2 | 0.8 part of Example 1b, dyestuff of formula No. VII |
| 8 | 3.6 parts of Example 2 | 0.7 part of Example 1a, dyestuff formula No. V |
| 9 | 3.4 parts of Example 3 | 1.2 parts of Example 1b, dyestuff of formula No. VIII |
| 10 | 3.4 parts of Example 3 | 1.4 parts of Example 1b, dyestuff of formula No. IX |
| 11 | 3.5 parts of Example 4 | 1.5 parts of Example 1b, dyestuff of formula No. IX |

We claim:

1. A mixture of (A) a phthalocyanine dyestuff having 1.5–4 cationic and/or basic groups and 0 or 1 sulfonic acid group, and (B) one eighth to twice its molar amount of a substantive azo dyestuff with a total number of cationic and/or basic groups greater than 2.

2. A mixture according to claim 1, which contains, as component (A), a dyestuff of the formula $$Cu-Pc\begin{matrix}(R)_{n1}\\(R')_{n2}\\(R'')_{n3}\\(SO_3H)_{(0-1)}\end{matrix}$$

PS wherein
Cu—Pc denotes the radical of a Cu-phthalocyanine dyestuff with $n_i = 0-4$ (i = 1 - 3), $$\sum_{i=1}^{3} n_i = n$$

and n = 1.5—4,

R, R' and R", independently of one another, denote a radical of the formula $$-CH_2-Z \text{ or } -SO_2-\overset{R_4}{\underset{|}{N}}-A-Z,$$

Z denotes a radical of the formula $$-\overset{R_1}{\underset{\underset{R_3}{|}}{N^{(+)}}}-R_2 \quad X^{(-)}, \qquad (Za)$$

$$-N\begin{matrix}R_1\\R_2\end{matrix} \qquad (Zb)$$

$$\begin{matrix}N\\ \| \\ N\\ | \\ R_5\end{matrix}-R_6 \text{ or} \qquad (Zc)$$

$$\begin{matrix}N\diagdown\overset{R_7(+)}{}\\ \| \quad \diagup R_6 \quad X^{(-)}\\ N\\ | \\ R_5\end{matrix} \qquad (Zd)$$

$R_1$, $R_2$ and $R_3$, independently of one another denote hydrogen or optionally substituted alkyl, or $R_1$ and $R_2$ together with the nitrogen atom, form a ring which optionally contains a further hetero atom, or $R_1$, $R_2$ and $R_3$, together with the nitrogen atom, form a pyridinium or picolinium ring, $R_4$ denotes hydrogen or optionally substituted alkyl, or together with $R_1$, denotes ethylene, $R_7$ is a substituent on one of the nitrogen atoms, $R_5$, $R_6$ and $R_7$, independently of one another, denote hydrogen or optionally substituted alkyl, $R_5$ additionally denotes a radical of the formula $$-CO-CH_2-Z,$$

$X^{(-)}$ denotes an anion, and
A denotes a bridge member.

3. A mixture according to claim 1, which contain, as component (B), a dyestuff of the formula $$D-(N=N-B)_c N=N-\underset{S}{\overset{OH}{\underset{}{\bigodot\bigodot}}}-\overset{NH-\overset{E}{\underset{N}{\diagup}}\overset{}{\underset{}{\diagdown}}\overset{}{\underset{}{\diagup}}}{\underset{S}{}}$$

wherein
S denotes a sulphonic acid group or an optionally inner salt of this sulphonic acid group, E denotes halogen, hydroxyl, alkoxy, alkyl, aryl or an optionally monosubstituted or disubstituted amino group, F denotes a radical of the formula $$-N\diagup\overline{\phantom{xx}}\diagdown N-R_8 \text{ or } -N\diagup\overline{\phantom{xx}}\diagdown \overset{(+)}{N}\diagup\overset{R_8}{\underset{R_9}{\diagdown}} \quad X^{(-)},$$

$R_8$ and $R_9$ independently of each other, denote hydrogen, alkyl, alkenyl or aralkyl, D denotes the radical of a diazo component of the benzene, naphthalene or heterocyclic series, B denotes the radical of a coupling component of the benzene naphthalene series, c denotes 0 or 1 and $X^{(-)}$ denotes an anion, and wherein the cyclic and acyclic radicals can carry further substituents.

4. A mixture according to claim 3, which contain, as component (B), a dyestuff of the formula

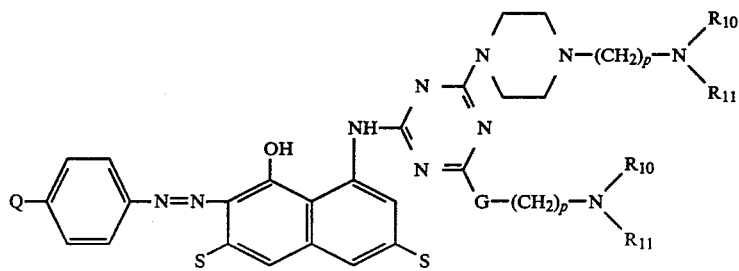

wherein
Q is a radical of the formula

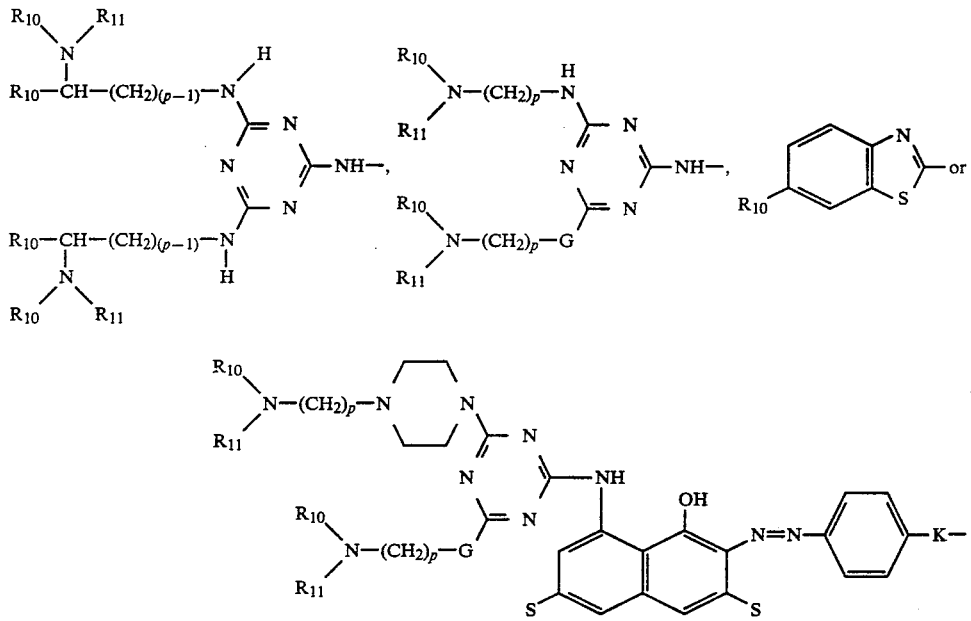

$R_{10}$ and $R_{11}$ denote hydrogen, methyl or ethyl,
P denotes 2 or 3,
G denotes NH or

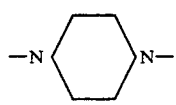

and

K denotes a direct bond, —NH—CO—, —NH-CONH—, —NHCO—$(CH_2)_p$CONH—, —$(CH_2)_p$—, —O—$(CH_2)_p$—O—, or —CONH—$(CH_2)_{pNHCO}$—

5. A mixture according to claim 1, of a phthalocyanine dyestuff of the formula

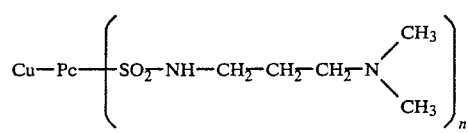

$n = 2.5 - 3.5$, and an azo dyestuff of the formula

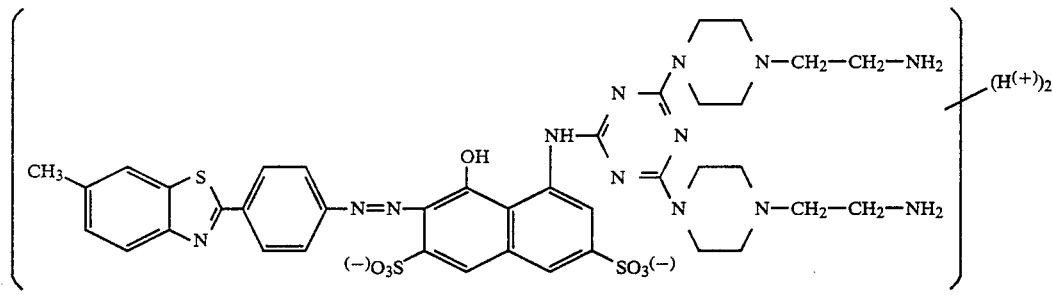

6. In the dyeing of paper wherein paper is contacted with an aqueous dyestuff composition, the improvement which comprises employing as the dyestuff in the composition a mixture according to claim 1.

* * * * *

UNITED STATES PATENT AND TRADEMARK OFFICE
CERTIFICATE OF CORRECTION

PATENT NO. : 4,521,217
DATED : June 4, 1985
INVENTOR(S) : Ulrich Beck, et al

It is certified that error appears in the above-identified patent and that said Letters Patent is hereby corrected as shown below:

Col. 3, line 1   After "carry" delete ".-"

Col. 8, line 7   Delete "waster" and substitute --water--

Col. 10, line 46  After "alcohol" delete ";" and substitute -- : --

Col. 11, line 36  Before "wherein" delete "PS"

Signed and Sealed this

Twenty-second Day of October 1985

[SEAL]

Attest:

DONALD J. QUIGG

Attesting Officer

Commissioner of Patents and Trademarks—Designate